(12) United States Patent
Rangarajan et al.

(10) Patent No.: US 6,363,332 B1
(45) Date of Patent: Mar. 26, 2002

(54) METHOD AND APPARATUS FOR PREDICTING A FAULT CONDITION USING NON-LINEAR CURVE FITTING TECHNIQUES

(75) Inventors: Sri K. Rangarajan; Jagannathan Sarangapani, both of Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/218,923

(22) Filed: Dec. 22, 1998

(51) Int. Cl.[7] ............... G06F 11/30; G06F 15/00; G21C 17/00
(52) U.S. Cl. ............... 702/185; 702/182; 701/29
(58) Field of Search ............... 702/34–40, 58, 702/59, 113–115, 182–185, 188; 701/29, 34; 361/115, 25, 27

(56) References Cited

U.S. PATENT DOCUMENTS

| | | | | |
|---|---|---|---|---|
| 3,747,403 A | * | 7/1973 | Yungul | 73/153.02 |
| 3,827,334 A | * | 8/1974 | English et al. | 409/80 |
| 4,184,205 A | * | 1/1980 | Morrow | 702/34 |
| 5,225,873 A | * | 7/1993 | Lux et al. | 399/26 |
| 5,239,468 A | * | 8/1993 | Sewersky et al. | 701/35 |
| 5,561,610 A | * | 10/1996 | Schricker et al. | 702/185 |
| 5,686,919 A | * | 11/1997 | Jordan et al. | 342/26 |

* cited by examiner

Primary Examiner—Patrick Assouad
Assistant Examiner—Manuel L. Barbee
(74) Attorney, Agent, or Firm—Blackwell, Sanders, Peper, Martin, LLP

(57) ABSTRACT

An apparatus for predicting a fault condition for a machine is disclosed. The machine has a plurality of parameters being dependent upon machine performance. A sensor is connected to the machine and is adapted to produce an electrical signal in response to one of the plurality of machine parameters. The apparatus further includes means for determining a non-linear data trend of the parameter in response to the electrical signal, and means for predicting the fault condition as a function of the trend and a threshold value indicative of the fault condition.

In a second aspect of the invention, a method for predicting a fault condition is provided. The method includes the steps of sensing a parameter having a level being dependent upon machine performance and responsively producing an electrical signal, determining a non-linear data trend of the parameter in response to the electrical signal, and predicting the fault condition as a function of the trend and threshold value indicative of the fault condition.

7 Claims, 9 Drawing Sheets

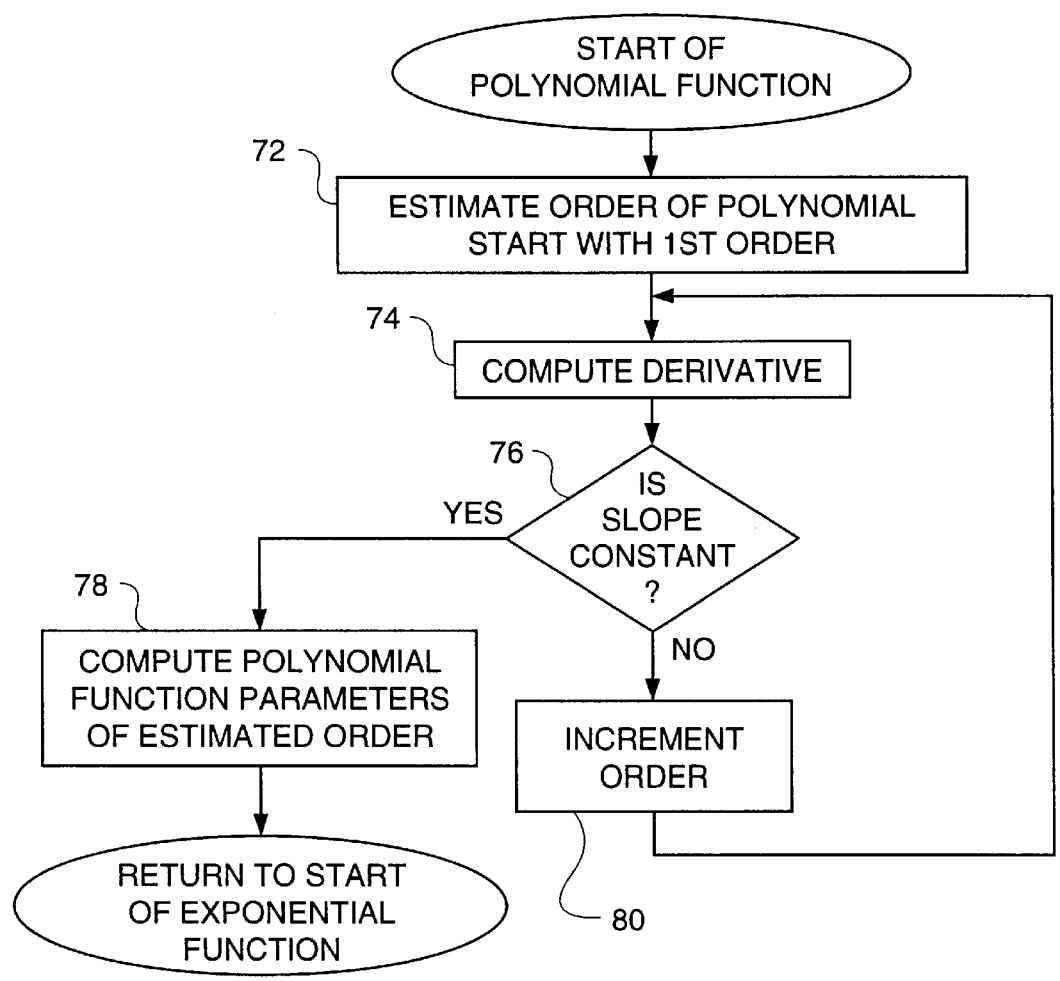
Fig-7-

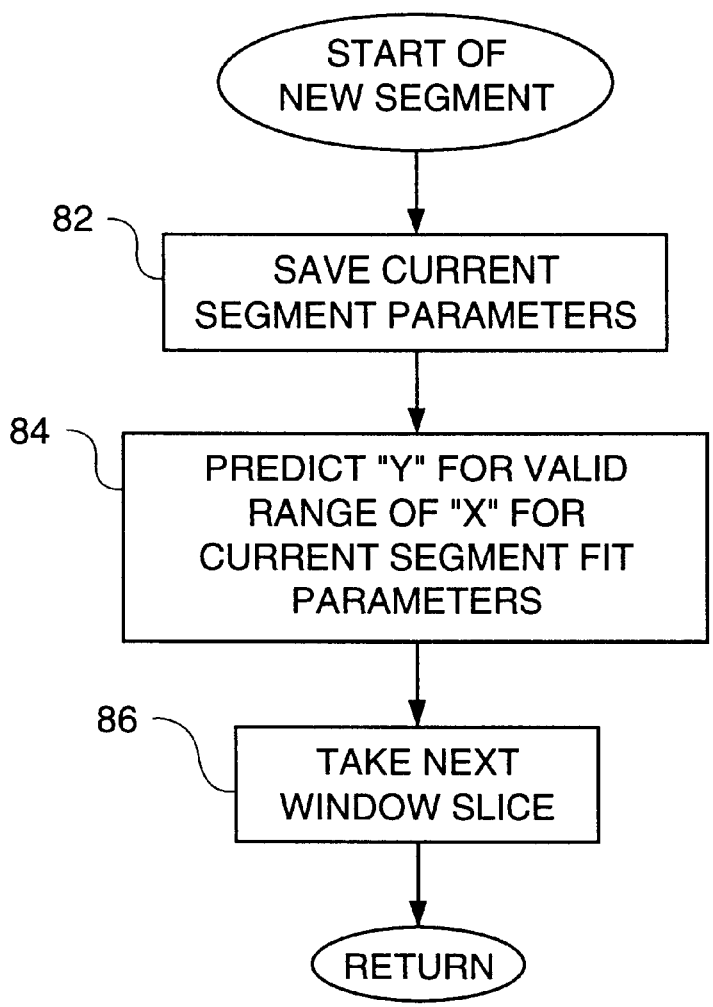

METHOD AND APPARATUS FOR PREDICTING A FAULT CONDITION USING NON-LINEAR CURVE FITTING TECHNIQUES

TECHNICAL FIELD

The invention relates generally to a device for predicting a fault condition associated with a machine, and more particularly, to a method and apparatus for predicting a fault condition in response to the trend of a machine parameter using non-linear curve fitting techniques.

BACKGROUND ART

For service and diagnostic purposes, machines are sometimes equipped with sensors for measuring operating conditions such as engine RPM, oil pressure, water temperature, boost pressure, oil contamination, electric motor current, hydraulic pressure, system voltage, and the like. In some cases, storage devices are provided to compile a data base for later evaluation of machine performance and to aid in diagnosis. Service personnel examine the accrued data to get a better picture of the causes of any machine performance degradation, wear or failure. Similarly, service personnel evaluate the stored data to predict future failures and associated collateral damages, and to correct any problems before total component failure.

In addition, these stored parameters may be examined by service or supervisory personnel to evaluate machine and/or operator performance to ensure maximum productivity of the machine. These issues are particularly pertinent to over-the-highway trucks and large work machines such as off-highway mining trucks, hydraulic excavators, track-type tractors, wheel loaders, and the like. These machines represent large capital investments and are capable of substantial productivity when operating. It is therefore important to predict significant performance loss, wear and catastrophic failures so servicing can be scheduled during periods in which productivity will be less affected and so minor problems can be repaired before they lead to catastrophic failures.

Similarly, it is sometimes advantageous to accumulate parameters only when the machine is in a particular operating condition. This type of information is predominantly used during performance evaluation but may also be used in failure diagnosis and prognosis. For example, the length of time spent in a particular gear while the machine is loaded may be needed to evaluate machine performance.

Currently, numerous methods and apparatus are known for predicting and diagnosing machine fault conditions. Reference, for instance, Schricker et al. U.S. Pat. No. 5,561,610, issued Oct. 1, 1996 to Caterpillar, Inc. which discloses linear curve fitting techniques for predicting fault conditions.

However, it has been observed that many available machine data streams are not best characterized utilizing linear functions, which results in less than optimal accuracy when it is attempted to predict and/or diagnose such fault conditions using the known linear techniques.

Accordingly, the present invention is directed to overcoming one or more of the problems set forth above.

DISCLOSURE OF THE INVENTION

An apparatus for predicting a fault condition for a machine is disclosed. The machine has a plurality of parameters being dependent upon machine performance. A sensor is connected to the machine and is adapted to produce an electrical signal in response to one of the plurality of machine parameters. The apparatus further includes means for determining a non-linear data trend of the parameter in response to the electrical signal, and means for predicting the fault condition as a function of the trend and a threshold value indicative of the fault condition.

In a second aspect of the invention, a method for predicting a fault condition is provided. The method includes the steps of sensing a parameter having a level being dependent upon machine performance and responsively producing an electrical signal, determining a non-linear data trend of the parameter in response to the electrical signal, and predicting the fault condition as a function of the trend and threshold value indicative of the fault condition.

BRIEF DESCRIPTION OF THE DRAWINGS

For a better understanding of the present invention, reference may be made to the accompanying drawings, in which:

FIG. 7 illustrates polynomial function fitting steps of the method of the present invention;

FIG. 8 illustrates steps for initializing the method of the present invention for a different data segment.

BEST MODE FOR CARRYING OUT THE INVENTION

Figure 1:
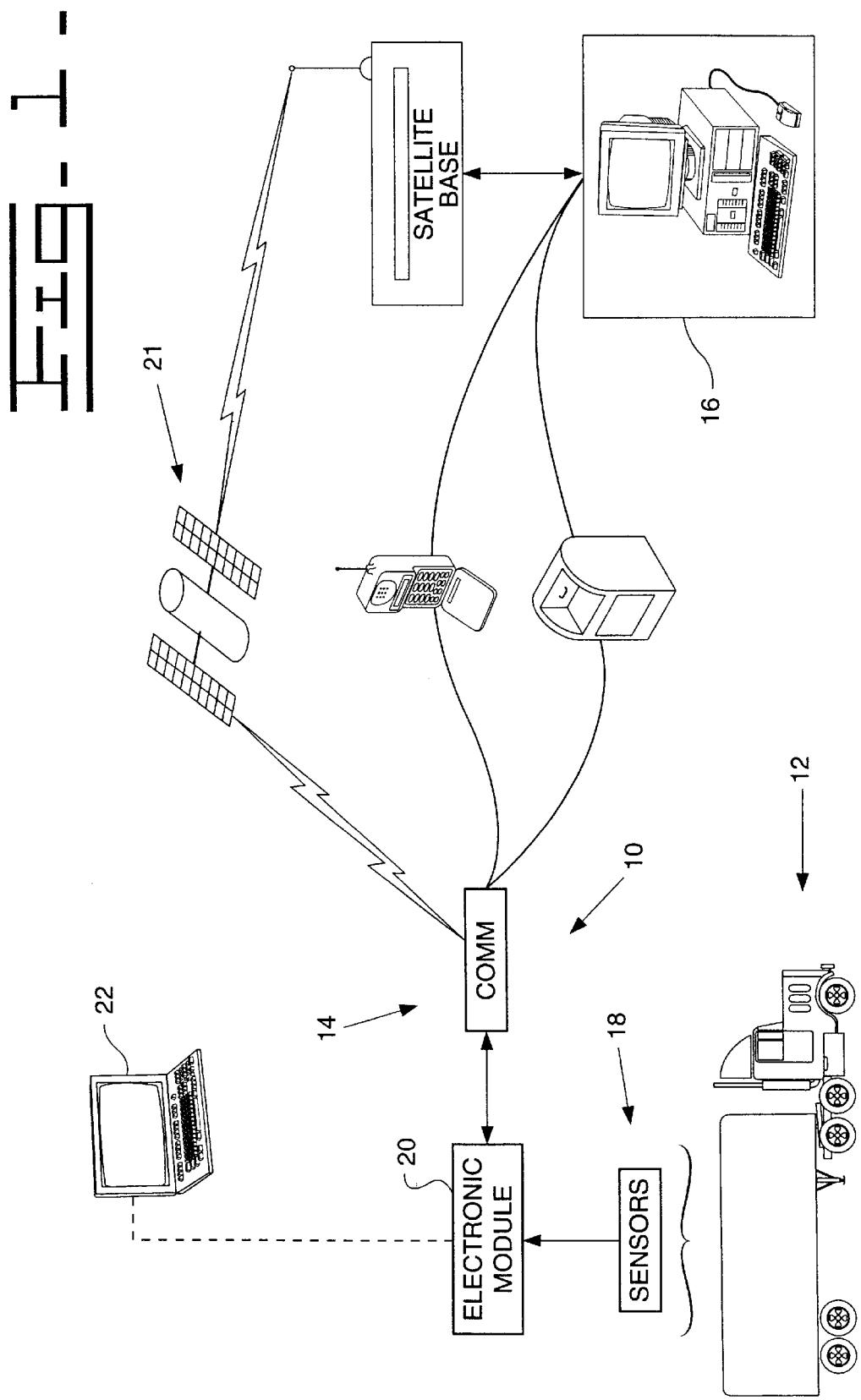
FIG. 1 is a high level diagrammatic illustration of a machine prognostic system.

Referring to FIG. 1, a machine prognostic system is shown generally by the number 10 and is a data acquisition, analysis, storage and display system for a work machine 12. Employing a complement of on-board and off-board hardware and software, the machine prognostic system 10 monitors and derives machine component information and analyzes the resulting data to indicate and/or predict impending component or system failures.

FIG. 1 illustrates a variety of potential communication systems 14 that may be used to transfer data from the work machine 12 to a central computer system 16 for analysis. For example, the data may be transferred by a satellite system back to the central computer system 16. Alternatively, the data may be transferred by a cellular telephone system or by storing data on a computer disk which is then mailed to the central computer site for analysis.

It should be understood that all aspects of the present invention could be located on-board the work machine 12 thereby eliminating the need for a communication system 14; however, the central computer system 16 allows an entire fleet to be monitored at a central location.

Subsets of the data are also transmitted to a display module (not shown) in the operator compartment in the form of gauges and warning messages. During normal operation, gauge values are displayed in the operator compartment. During out-of-spec conditions, alarms and warning/instructional messages are also displayed.

In the preferred embodiment, sensed data is directly sampled by sensors 18 of a type well-known in the art for producing electrical signals in response to the level of operational parameters and includes pulse-width modulated sensor data, frequency-based data, five volt analog sensor data, and switch data that has been effectively debounced. The sensors are connected to an electronic module 20 for delivery of the sensor signals.

Figure 2:
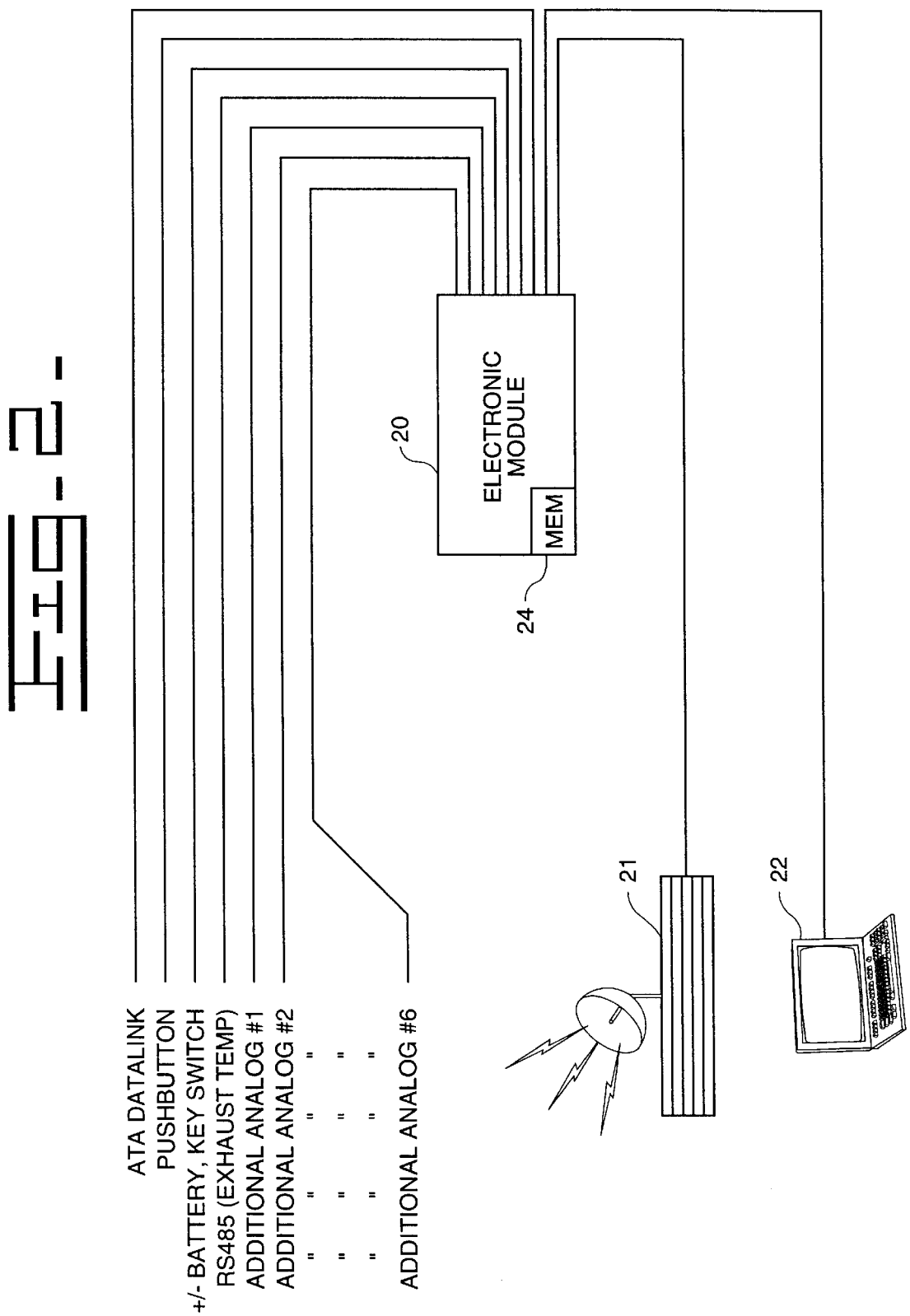
FIG. 2 illustrates a plurality of machine parameter connections to an electronic module of the machine prognostic system.

In the embodiment of FIGS. 1 and 2, the sensor signals are delivered to the electric module 20 by either direct connection of analog sensors, connection by way of an RS485 link, or over a datalink governed by SAE specifications J1587 and J1708. A push-button is also included to trigger the acquisition of a snapshot of data. Connection is also provided from the machine battery and key switch to the electronic module 20.

In the preferred embodiment, the electronic module 20 includes a microprocessor, a lower level communications board (not shown) of a type well-known in the art, and a memory section 24 including high level flash memory and battery backed RAM. The electronic module also includes a pair of RS232 connections, one being available for connection to the satellite communications system 21 and the other being available for connection to an off-board computer 22 used in downloading of data and initialization of the system. In the preferred embodiment, the off-board computer 22 is a laptop personal computer.

To document the performance of the machine and/or its major components, performance baselines are stored in an array within the memory device located in the electronic module 20. These baselines are used during key, repeatable performance checks of the machine to help verify machine/component health and, as discussed below, are used as reference points to determine whether the machine is in an operating condition in which machine parameters are to be processed and stored.

A subset of parameters for which trend data is to be produced is either predefined or defined via the off-board computer 22 or the central computer 16. Each parameter includes a dependency definition that identifies the conditions under which data will be stored for trending purposes. Typically, the dependency definition is selected to indicate the normal operating conditions of the machine; for example, when RPM or boost pressure are above predetermined levels. The trending definition for each parameter may vary and may be a function of several other machine parameters that shall be referred to as dependencies. Trend data is gathered and stored in memory as the specified dependency definition is met over a specified trend period, which is measured either in time, such as over a period of ten hours, or in counts, such as over a period of ten transmission shifts. Trend data is only obtained while the engine is running. Based on the specified trend type, the maximum, minimum, or cumulative value of data gathered during this period is then stored as a single trend point with counts to determine the average value and/or the points available. The determination of whether to use the average, maximum, or minimum value to obtain the trend point is based on the system designer's decision regarding which type of calculation would provide the best indication of changes in engine performance or impending failures. It should also be understood that multiple values could be calculated for the same sensed parameter, i.e., trend points could be calculated to indicate both an average value and a minimum value for a designated machine parameter.

Figure 3:
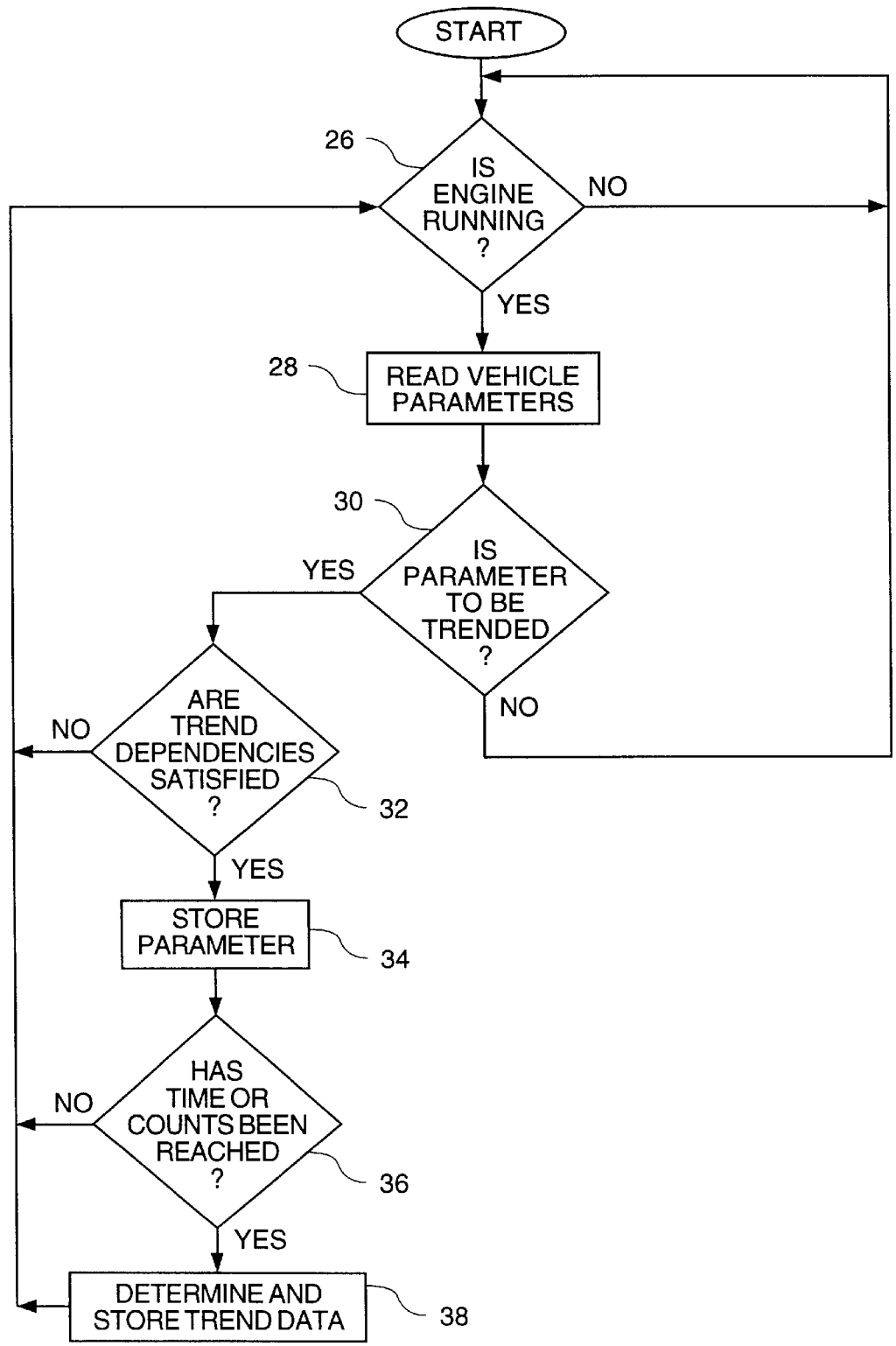
FIG. 3 illustrates a method performed by the electronic module to trend machine parameters.

Referring now to FIG. 3, one method executed by the processor within the electronic module 20 to perform the above functions is now described. At decision block 26, the electronic module 20 first determines whether the engine is running. Advantageously, the engine is determined to be running if engine speed exceeds cranking engine speed. If the engine is not running, then the method will not proceed. If the engine is running, at block 28, the electronic module 20 reads the sensed machine parameters from the datalink or other inputs.

At decision block 30, for each of the sensed parameters, the electronic module 20 determines whether that parameter is to be processed to provide trend data. If trend data is to be provided, the trending definition is retrieved and the dependency parameters are checked to determine whether the dependency definition is satisfied as shown at decision block 32. The dependency definition for each operating parameter of interest is defined in terms of other sensed machine parameters. For example, the dependency definition for boost pressure may be satisfied only when engine RPM is greater than a low operating speed and less than a high operating speed, when the engine rack setting is greater than a predetermined level, and when the jacket water temperature is greater than a predefined operating temperature. That is, values for boost pressure are only saved and processed for producing trend information when the above conditions are satisfied. In this way, all boost pressure values used to produce the trend data will have been acquired when the engine is in the same general operating condition. It should be understood that the actual ranges, minimums, and maximums used in the dependency definitions are determined empirically to define the operating conditions of interest and will vary from machine to machine and application to application.

As shown at block 34, if the dependency definition is satisfied, the value of the sensed parameter is stored. As shown at blocks 36 and 38, this process is continued until either the time period over which each trend point is to be determined is reached at which point the electronic module 20 calculates and stores the trend point. The time period or number of events is selected in response to the designer's desire for precision, the availability of memory space in the memory device, and the length of time or number of counts required to obtain meaningful trend points. The calculation of the trend point may include accumulating the stored values, selecting the maximum stored value, or selecting the minimum stored value. The calculated trend point is saved and the data array for that parameter is then cleared to allow for the storage of data for calculation of the next trend point for that parameter.

Figure 4:
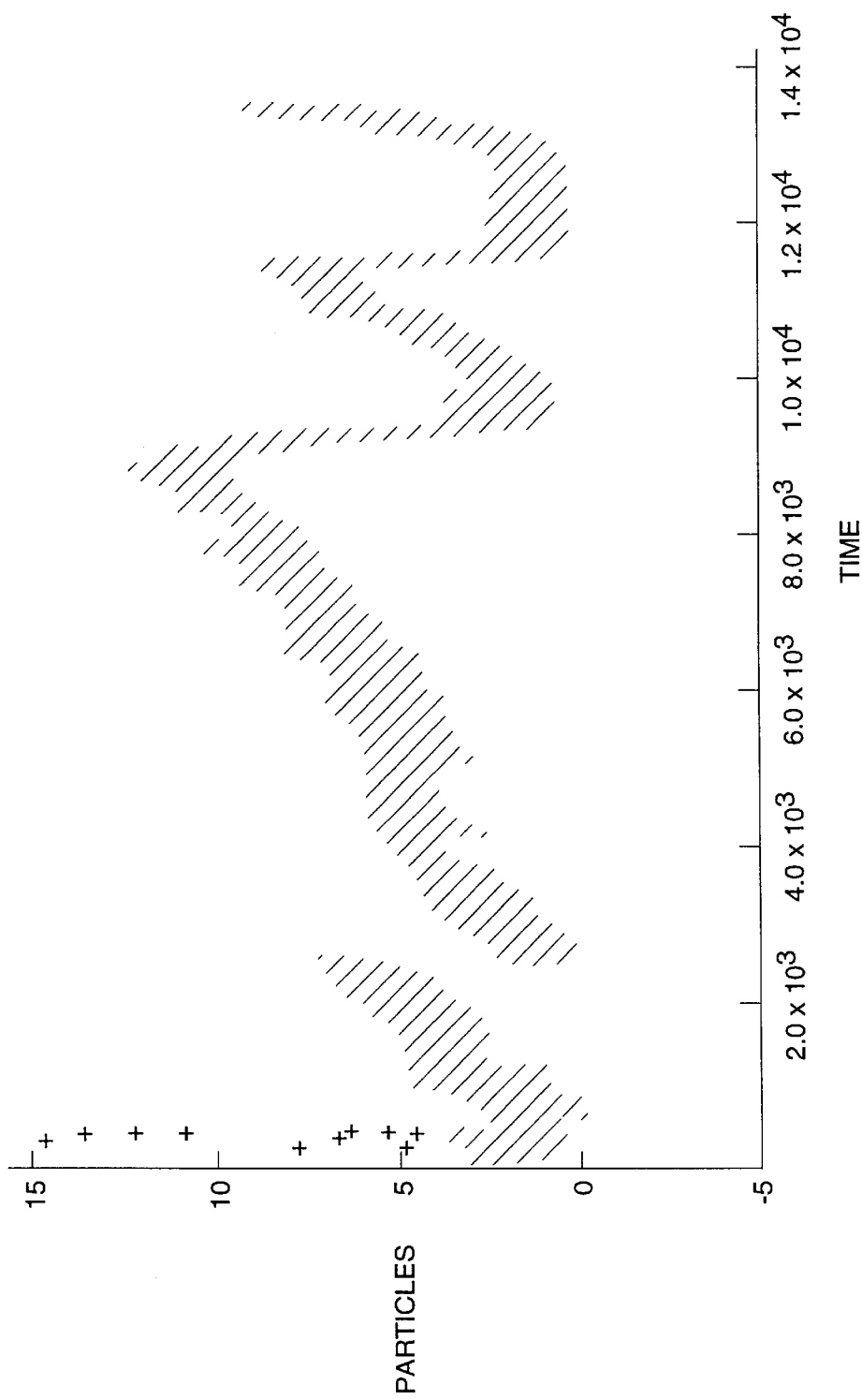
FIG. 4 illustrates an example group of data points collected according to the method of FIG. 3 and to be used for the method of predicting a fault condition according to the present invention.

Trend data obtained by way of the method of FIG. 3 is illustrated in FIG. 4. The data points of FIG. 4 represent metallic chips or particles detected in an oil flow of the machine verses operating time, time being shown logarithmically. Due to the time period represented, straight lines cannot be readily fit to the data to illustrate the general trend of the data by known curve fitting techniques, such as the least-squares method. For the same reason, however, the illustrated data is well suited for trending using non-linear curve fitting techniques.

Before proceeding, in addition to the trend data produced for sensed parameters, it should be understood that calculated values, such as net horsepower or driveline torque, may also be trended in a similar manner. Typically, these calculated values are determined by the electronic module 20 according to the predetermined definitions in response to a plurality of sensed parameter signals.

Trend data may be reset and the definitions may be redefined by the off-board system 22 via one of the communication ports. For example, if a particular application of the machine requires a different dependency definition for one or more of the sensed parameters, the off-board system 22 is used to modify the dependency definition by providing commands to erase a given array including a given dependency definition and replace that definition with a new dependency definition. Similarly, this function may be performed by the central computer system 16 via the communication system 14.

The present invention provides a method and apparatus for accurately and reliably predicting a fault condition using data sets or segments such as illustrated in FIG. 4, using non-linear curve fitting techniques.

Figure 5:
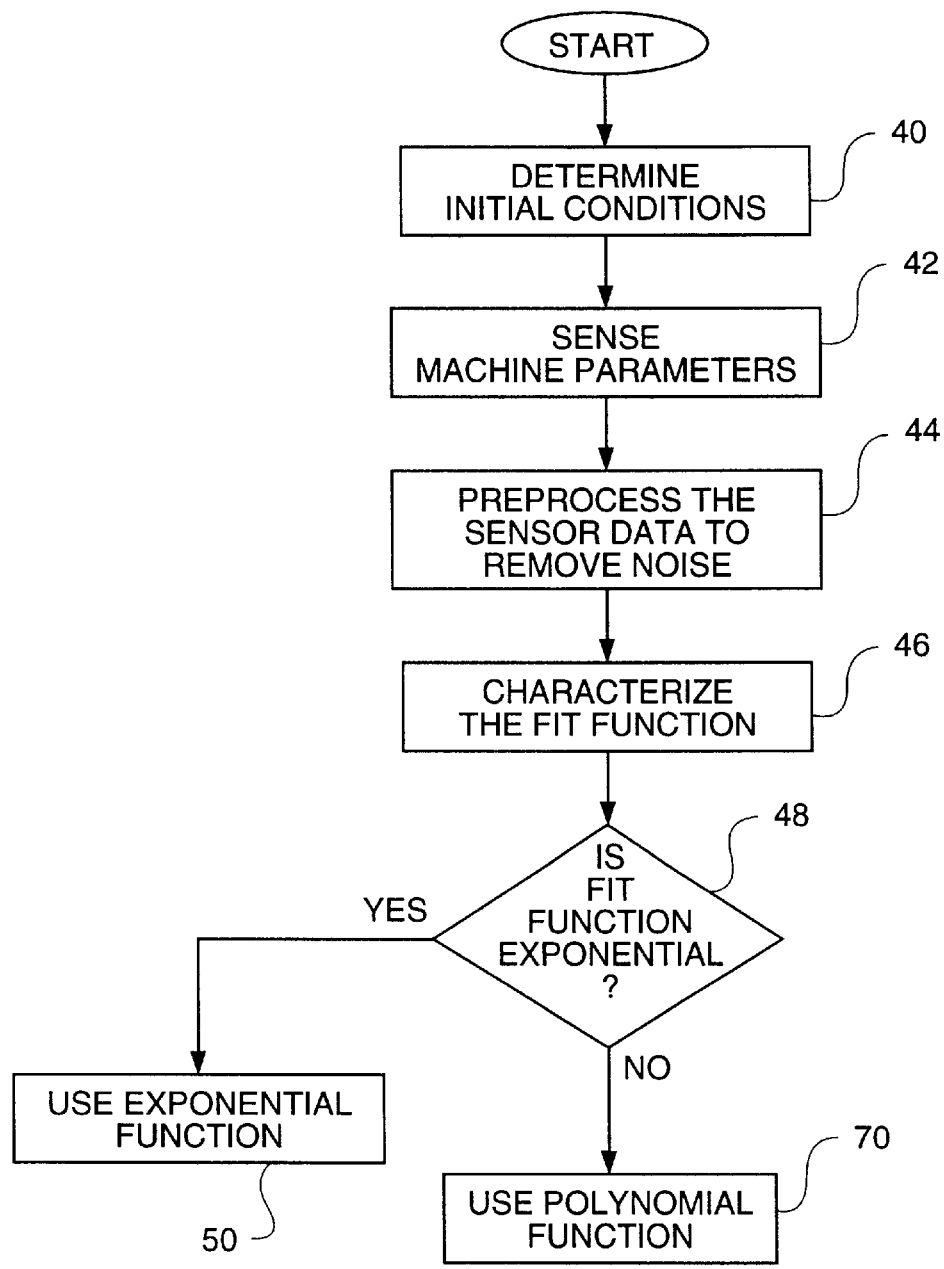
FIG. 5 illustrates initial characterizing steps of the method for predicting a fault condition according to the present invention.

Referring to FIG. 5, at control block 40, the initial conditions for curve fitting according to the present invention are set. Such conditions include, but are not limited to, window size, that is, the number of points of collected data to use, and fit tolerance, which specifies deviation using a suitable method, such as the least-squares method or the like. At control block 42, the machine parameters are sensed, as explained above. Then, as shown at control block 44, the data is preprocessed to remove noise.

Beginning at control block 46, the fit function for the selected data set is characterized. Here, it has been found that it is easier to first determine whether the best fit function is an exponential function. Thus, at decision block 48, it is determined whether the function is exponential. If yes, it is attempted to fit an exponential function curve to the data set, as shown at control block 50.

Figure 6:
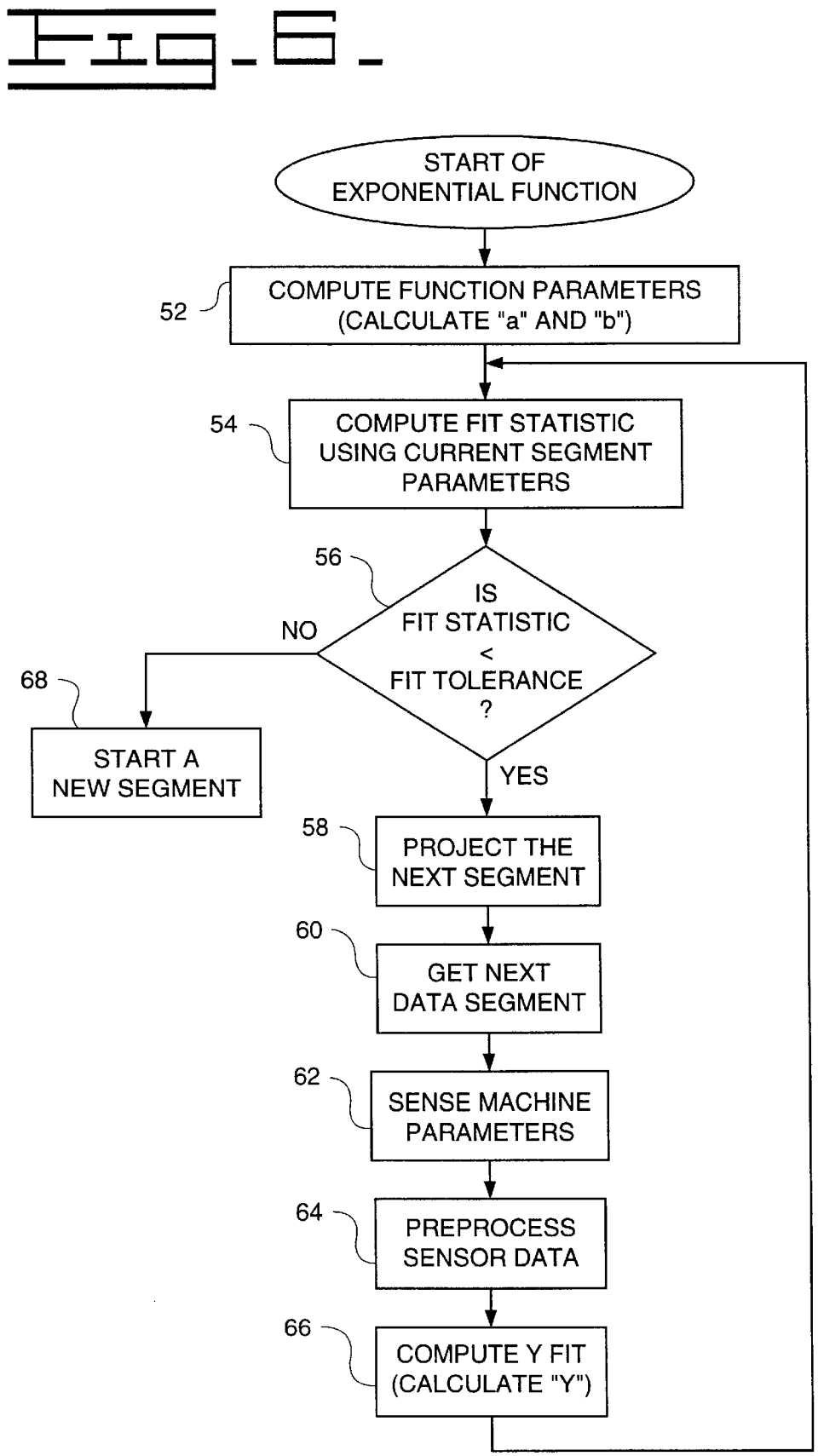
FIG. 6 illustrates exponential function fitting steps of the method of the present invention.

Turning to FIG. 6, for the exponential function curve fit attempt, functional parameters a and b are first computed, as shown at control block 52, using a suitable equation, such as the following.

$$y = a\text{EXP}(bt)$$

At control block 54, the fit statistic is computed using the current segment parameter data, i.e., the number of data points. Then, at decision block 56, it is determined whether the fit statistic is less than the fit tolerance. This determination can be made using any suitable means, such as a standard deviation computation. If the fit statistic is less than the fit tolerance, the exponential function fits and the next data segment can be projected, as shown at control block 58. Similarly to the steps discussed in reference to FIG. 5 above, the next data segment is retrieved as shown at control block 60; the machine parameters are sensed at control block 62; the sensor data is preprocessed at control block 64; and y is calculated as shown at control block 66. The method then returns to control block 54 to compute the fit statistic.

If at decision block 56 the statistic is determined to be greater than the fit tolerance, a new data segment is fitted, as shown at block 68.

Returning to decision block 48 of FIG. 5, if it is determined that the exponential function does not fit the data set, then, fitting a polynomial function curve to the data set will be attempted, as shown at block 70.

With reference to FIG. 7, fitting the polynomial function involves the first step of estimating the order of the polynomial, as shown at block 72. Generally, it is preferred to assume a first order polynomial as it has been found to be the easiest and fastest. At block 74, the derivative of the polynomial is computed. Then, at decision block 76, a determination is made whether the slope of the resultant curve is constant. If yes, at block 78, the polynomial function parameters are computed. If the slope is not constant, the order of the polynomial is incremented upwardly, to the second order, as shown at block 80 and the derivative thereof is again computed as shown at block 74, and a determination of whether the slope is constant is made, as shown at decision block 76. If the slope again is not constant, the order of the polynomial is incremented upward again. That is, a third order polynomial and subsequent higher order polynomials are tried until a polynomial order resulting in a constant slope is found.

Once a curve is fit to a data segment, curve fitting for a new data segment is tried. Referring to FIG. 8, the current segment fit parameters are saved, as shown at block 82. Then, a y for a valid range of x for the current segment is predicted, using current segment fit parameters as shown at block 84. If the fit is within desired tolerances, the present curve fitting method is applied to the next data segment, as shown at block 86, and the above described steps are repeated, beginning at block 42.

Figure 9:
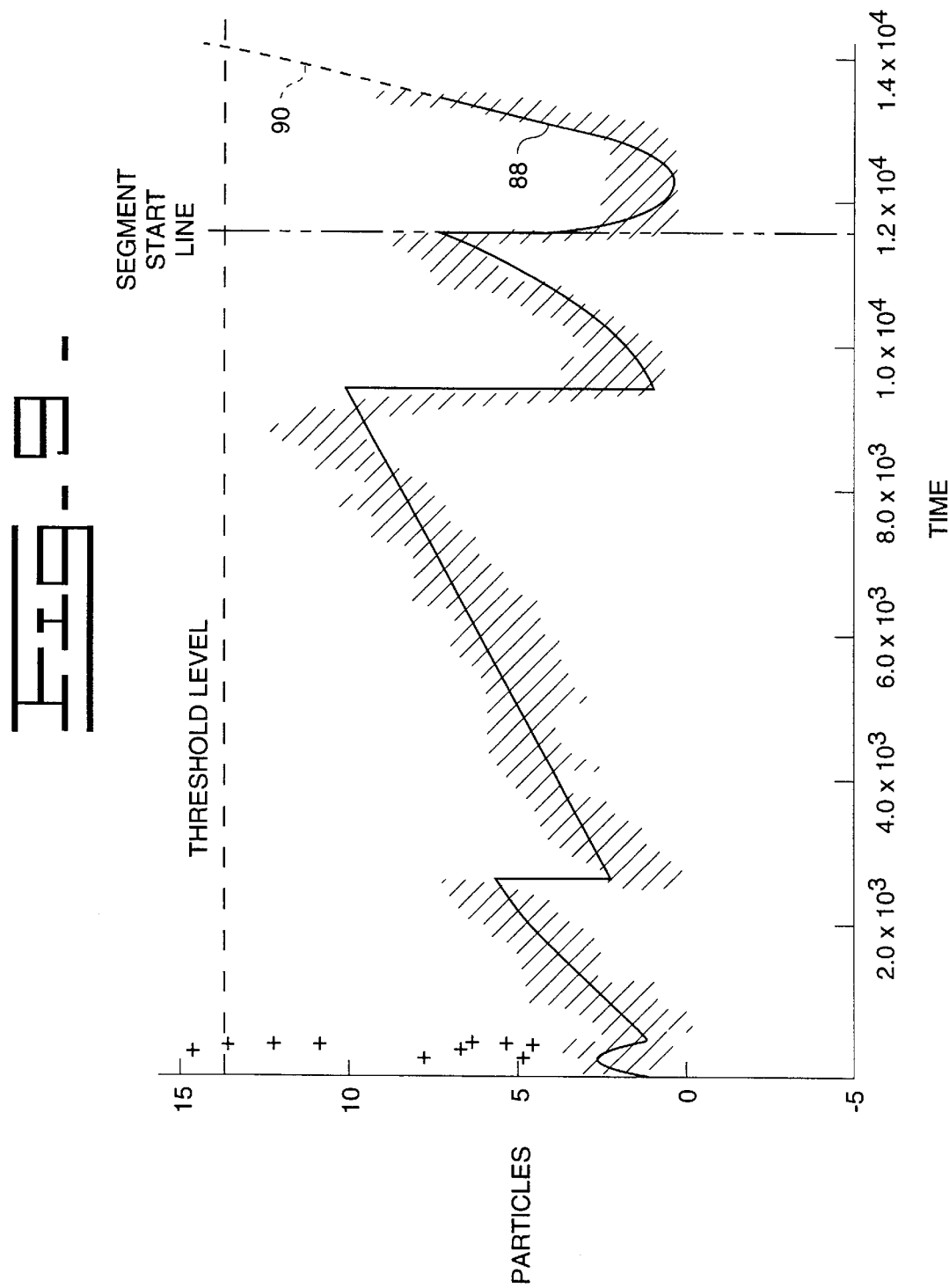
FIG. 9 illustrates an example of a non-linear curve showing a trend of a machine parameter including a projection showing the curve at a threshold level representative of a fault condition.

With reference to FIG. 9, second order polynomial non-linear curves are shown fitted to the data points of FIG. 4. Note that a threshold level is added to the illustration, the threshold level representing fourteen particles which is considered to be evidence of a fault condition. It is thus desired to determine when the number of chips in the oil flow will reach the threshold level, such that an appropriate warning can be generated, such as illumination of a warning light in the operating cab of the machine such as the cab of work machine 12 and/or storage of a warning message in a memory device such as device 24 for retrieval by service personnel, as explained above. Examining FIG. 9, a second order polynomial curve 88 begins with data points on the right of the segment start line and continues rightward to the last data points of the segment. Dashed line 90 represents a projection of curve 88, the time duration between the last data point and the intersection of projection 90 with the threshold level providing an indication of the predicted time before occurrence of the failure mode.

INDUSTRIAL APPLICABILITY

Work machines such as over-the-highway trucks and large mining and construction machines represent large capital investments and significantly reduce overall productivity for the owner when they are being repaired. To reduce the loss of productivity, the present invention provides service and supervisory personnel with historical data relating to sensed machine parameters. This historical data is then used to diagnose failures, predict future failures, and evaluate machine and/or operator performance using non-linear curve fitting techniques.

Other aspects, objects, and advantages of this invention can be obtained from a study of the drawings, the disclosure, and the appended claims.

What is claimed is:

1. An apparatus for predicting a fault condition, comprising:

a machine having a plurality of parameters being dependent upon machine performance;

a sensor connected to the machine and adapted to produce an electrical signal in response to one of the plurality of machine parameters;

means for determining a non-linear data trend of the parameter in response to the electrical signal where said means for determining further comprises a means for fitting an exponential function to the trend and if a predetermined fit tolerance is not achieved, then fitting a polynomial function to the trend;

means for predicting the fault condition as a function of the trend and a threshold value indication of the fault condition.

2. The apparatus, as set forth in claim 1, further comprising means for computing a value as a function of the electrical signal for determining the non-linear data trend.

3. The apparatus, as set forth in claim 1, further comprising an output device for displaying a fault signal when the fault condition has been predicted.

4. The apparatus, as set forth in claim 1, wherein the means for predicting the fault condition are located on the machine.

5. The apparatus, as set forth in claim 1, wherein the means for predicting the fault condition comprise a computer.

6. A method for predicting a fault condition for a machine, the machine having a plurality of parameters being dependent upon machine performance, the method comprising the steps of:

sensing one of the parameters dependent upon machine performance and responsively producing an electrical signal;

determining a non-linear data trend of the parameter in response to the electrical signal where determining a non-linear data trend further comprises the steps of attempting to fit an exponential function to the trend, and if the exponential function does not fit the trend within a predetermined tolerance limit, attempting to fit a polynomial function to the trend; and predicting the fault condition as a function of the trend and a threshold value indicative of the fault condition.

7. A method of predicting a fault condition comprising the steps of:

sensing with a sensor at least one of a plurality of parameters of a machine where said parameters are dependent upon machine performance and responsively producing trend data;

determining a polynomial function representative of the trend data, where the step of determining includes determining an order of the polynomial by iteratively incrementing an estimated order and computing a derivative until the resultant slope is constant, and then computing the parameters of the polynomial of the determined order; and predicting the fault condition as a function of the polynomial function and a threshold value indicative of the fault condition.

* * * * *